United States Patent
Takayama et al.

(10) Patent No.: US 11,622,059 B2
(45) Date of Patent: Apr. 4, 2023

(54) IMAGE READING APPARATUS AND IMAGE FORMING SYSTEM TO ADDRESS RISE IN TEMPERATURE OF A READING SENSOR WITH THE USE OF A FAN WITHIN A READING SENSOR HOUSING

(71) Applicant: CANON KABUSHIKI KAISHA, Tokyo (JP)

(72) Inventors: Hiroki Takayama, Chiba (JP); Masashi Sawada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/204,723

(22) Filed: Mar. 17, 2021

(65) Prior Publication Data

US 2021/0306504 A1  Sep. 30, 2021

(30) Foreign Application Priority Data

Mar. 25, 2020 (JP) .............................. JP2020-054730

(51) Int. Cl.
*H04N 1/04* (2006.01)
*H04N 1/00* (2006.01)
*H04N 1/024* (2006.01)

(52) U.S. Cl.
CPC ..... *H04N 1/00981* (2013.01); *H04N 1/00591* (2013.01); *H04N 1/024* (2013.01)

(58) Field of Classification Search
CPC .......... H04N 1/00591; H04N 1/00981; H04N 1/00596; H04N 1/1235; H04N 1/2032; H04N 1/024

USPC ..... 399/92, 94, 16; 358/1.11–1.18, 400–404, 358/474
See application file for complete search history.

(56) References Cited

U.S. PATENT DOCUMENTS

| | | | |
|---|---|---|---|
| 5,860,042 A | * | 1/1999 | Tomaru ............ G03G 15/04045 399/92 |
| 2004/0009005 A1 | * | 1/2004 | Suga ...................... G03G 15/60 399/94 |
| 2012/0097872 A1 | * | 4/2012 | Ito ...................... G03G 15/0189 250/559.4 |

(Continued)

FOREIGN PATENT DOCUMENTS

| | | | |
|---|---|---|---|
| JP | 2004242211 A | * | 8/2004 |
| JP | 2020006628 A | | 1/2020 |

*Primary Examiner* — Chad Dickerson
(74) *Attorney, Agent, or Firm* — Canon U.S.A., Inc. I.P. Division

(57) ABSTRACT

An image reading apparatus connected to a conveying apparatus to convey a recording medium to which a toner image is fixed includes a conveying unit and a reading unit having a transparent member, a reading sensor, a housing supporting, and a fan. The conveying unit receives the recording medium discharged from the conveying apparatus and conveys the recording medium. The reading unit is positioned downstream of the conveying unit in a conveying direction of the recording medium. The reading sensor read a housing supporting image information about an image on the recording medium through the transparent member. The housing supports the reading sensor and defines, together with the transparent member, an accommodation space configured to accommodate the reading sensor. The fan is positioned in the accommodation space and circulates air in the accommodation space.

16 Claims, 14 Drawing Sheets

(56) References Cited

U.S. PATENT DOCUMENTS

2013/0164000 A1* 6/2013 Nemoto ............. G03G 15/5062
399/16
2015/0146225 A1* 5/2015 Okada ................ H04N 1/00981
358/1.13
2017/0171417 A1* 6/2017 Kasuga ................ H04N 1/0282
2018/0278762 A1* 9/2018 Kawatsu ............ H04N 1/00557

* cited by examiner

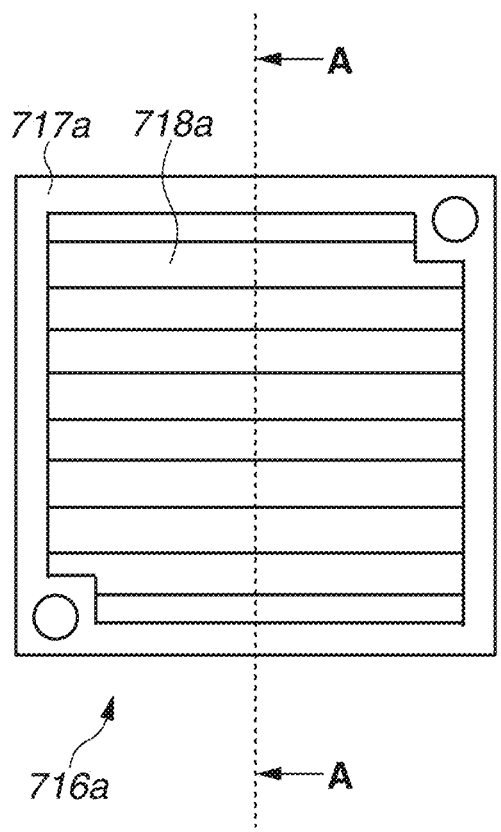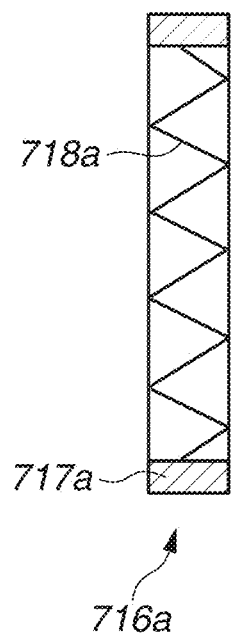

IMAGE READING APPARATUS AND IMAGE FORMING SYSTEM TO ADDRESS RISE IN TEMPERATURE OF A READING SENSOR WITH THE USE OF A FAN WITHIN A READING SENSOR HOUSING

BACKGROUND

Field

The present disclosure relates to an image reading apparatus that reads image information about images on recording media, and an image forming system including an image reading apparatus.

Description of the Related Art

There is a conventionally known image forming apparatus that forms images on recording media in toner or ink. Such an image forming apparatus can have images on both sides of a recording medium shifted in position or different color tone images varying with individual recording media due to changes in ambient temperature or shifts in conveying timing, failing to satisfy the user's desire.

As a result, the user checks whether such a position shift or different color tones appear on images, and then changes the corresponding settings on the image forming apparatus each time. The check on recording media and adjustment on image forming apparatus place great burden on the user, taking a long time.

In Japanese Patent Application Laid-Open No. 2020-6628, the following reading apparatus is provided. To adjust a positional shift in an image formed on a recording medium by an image forming apparatus, adjust feedback on a change in color tone with time, or detect a formed abnormal image, a reading apparatus reads the image formed on the recording medium by the image forming apparatus.

With a reading unit placed opposite to a conveying path as discussed in Japanese Patent Application Laid-Open No. 2020-6628, the reading unit may often be provided with a reading sensor covered in a glass housing or in a case to have no effect of foreign matter such as dirt and dust on the reading results obtained by the reading sensor in the reading unit.

The covering of a reading sensor in a glass housing or in a case however can cause heat from a hotter light source included in the reading sensor due to a continuous reading operation to be left around the reading sensor in the reading unit. Such a heat effect on the reading sensor can cause an inaccurate reading result.

SUMMARY

The present disclosure is directed to reducing the rise in the temperature of a reading sensor provided in a reading unit.

According to an aspect of the present disclosure, an image reading apparatus connected to a conveying apparatus to convey a recording medium to which a toner image is fixed includes a conveying unit configured to receive the recording medium discharged from the conveying apparatus and convey the recording medium, and a reading unit positioned downstream of the conveying unit in a conveying direction of the recording medium, wherein the reading unit includes: a transparent member, a reading sensor configured to read image information about an image on the recording medium through the transparent member, a housing supporting the reading sensor, wherein the housing defines, together with the transparent member, an accommodation space configured to accommodate the reading sensor, and a fan positioned in the accommodation space and configured to circulate air in the accommodation space.

Further features of the present disclosure will become apparent from the following description of exemplary embodiments with reference to the attached drawings.

BRIEF DESCRIPTION OF THE DRAWINGS

FIG. 14A is a top view of a filter unit.

FIG. 14B is a cross-sectional view of the filter unit.

DESCRIPTION OF THE EMBODIMENTS

With reference to the drawings, the dimensions, the materials, the shapes, and the relative arrangement of components described in these exemplary embodiments do not limit the scope of the present disclosure.

The exemplary embodiments will be described using an electrophotographic laser beam printer as an image forming apparatus. Alternatively, an image forming apparatus based on another method, such as an inkjet printer or a sublimation printer, may be used.

Figure 1:
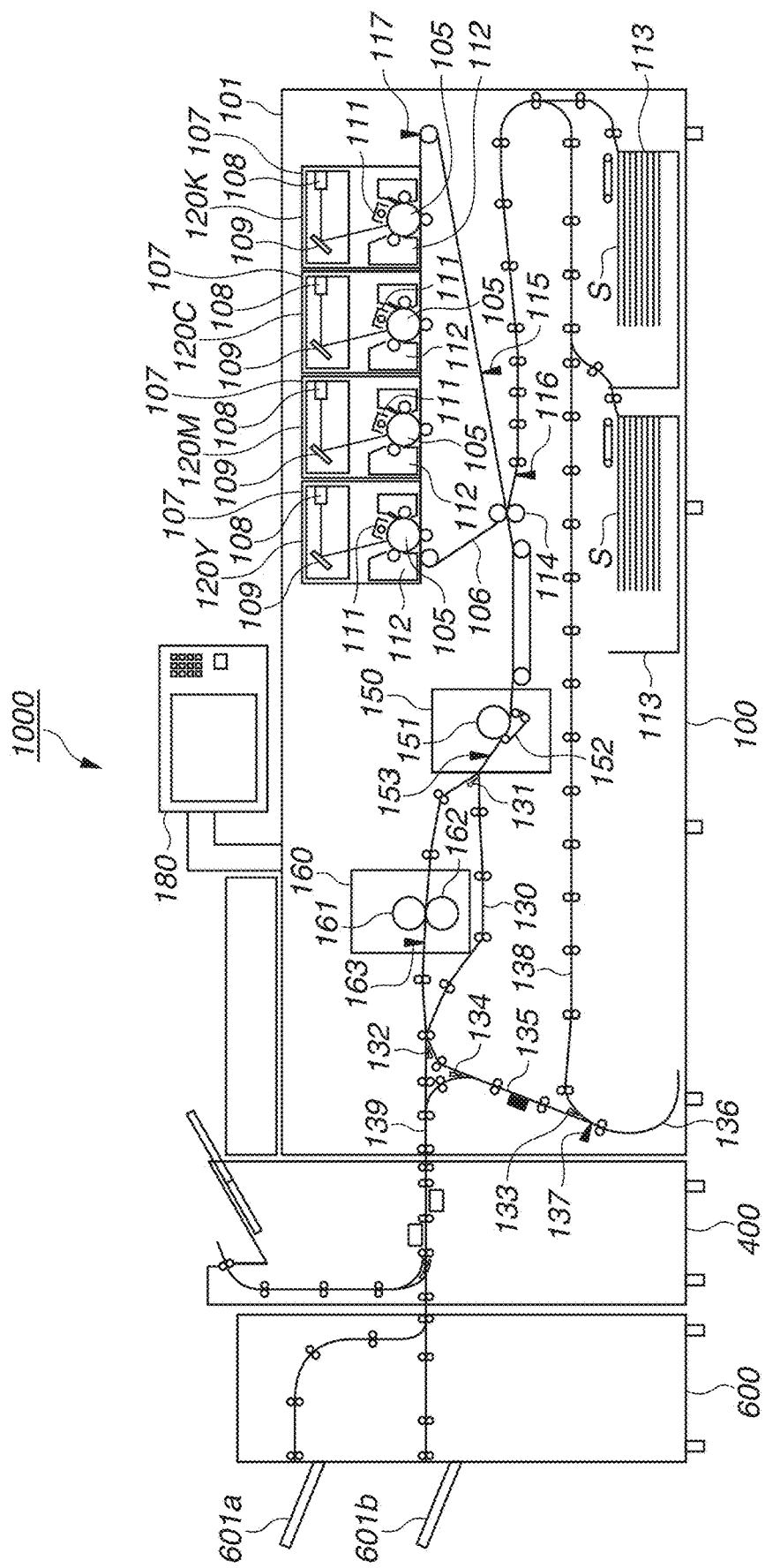
FIG. 1 is a schematic cross-sectional view of an image forming system.

FIG. 1 is a schematic cross-sectional view illustrating an image forming system 1000 according to a first exemplary embodiment. The image forming system 1000 according to the present exemplary embodiment includes an image forming apparatus 100, an image reading apparatus 400, and a processing apparatus 600, which are placed in the order from upstream to downstream in the conveying direction of recording media and linked to each other. Specifically, the image forming apparatus 100 is connected to the image reading apparatus 400 placed downstream in the conveying direction of recording media, and the image reading apparatus 400 is connected to the processing apparatus 600 placed further downstream in the conveying direction of recording media. The image forming apparatus 100 is an example of a conveying apparatus that conveys recording media to which toner images are fixed. The image forming apparatus 100, the image reading apparatus 400, and the processing apparatus 600 will each be described in detail of the configuration below.

The configuration and the operation of the image forming apparatus 100 will be described. The image forming apparatus 100 includes a housing 101 composed of support frames and exterior covers (not illustrated). The housing 101 is equipped with an operation unit 180, and the image forming apparatus 100 can display their statuses to a user via the operation unit 180. The image forming apparatus can receive operations from the user via the operation unit 180.

The housing 101 accommodates and supports individual units such as image forming units 120Y, 120M, 120C, and 120K to form images on recording media, storage portions 113 that each store recording media, an intermediate transfer member 106 to transfer toner images onto recording media, a fixing unit to fix toner images to recording media, and a conveying unit.

The image forming units 120Y, 120M, 120C, and 120K have the same configuration except for toner colors only, which are yellow, magenta, cyan, and black, respectively. The following is a description of the configuration of the image forming unit 120Y only. As for the image forming units 120M, 120C, and 120K, like numbers refer to like components, and redundant descriptions of their detailed configurations will be omitted.

The image forming unit 120Y includes a photosensitive drum 105, a charging device 111 to charge the photosensitive drum 105, a laser scanner unit 107 to emit laser light to expose the charged photosensitive drum 105, a reflecting mirror 109 to reflect the laser light emitted from the laser scanner unit 107 toward the photosensitive drum 105, and a developing device 112 to develop an electrostatic latent image formed on the photosensitive drum 105 by the photosensitive drum 105 being exposed.

The laser scanner unit 107 includes a laser driver to switch between the emission and no emission of laser light from a semiconductor laser according to image data fed from a control unit (not illustrated). The laser scanner unit 107 also includes a rotary polygon mirror, with which laser light emitted from the semiconductor laser is scanned in the scanning direction. The laser light scanned in the scanning direction is guided via the reflecting mirror 109 to the photosensitive drum 105 and scans the photosensitive drum 105 along the rotational axis of the photosensitive drum 105.

An electrostatic latent image formed on the photosensitive drum 105 by the laser light being scanned is developed with toner supplied from the developing device 112. As described above, the image forming units 120Y, 120M, 120C, and 120K have respective developing devices 112, which include different color toners from one another. Thus, the respective photosensitive drums 105 of the image forming units 120Y, 120M, 120C, and 120K each have a toner image different in colors from one another formed thereon.

The toner images thus formed on the respective photosensitive drums 105 of the image forming units 120Y, 120M, 120C, and 120K are transferred (primarily transfer) onto the intermediate transfer member 106 to which a voltage opposing the electric potential of the toner images is applied. The multicolor toner images formed by the image forming units 120Y, 120M, 120C, and 120K are overlaid on one another, thereby forming a color image on the intermediate transfer member 106.

Meanwhile, individual sheets of recording media S stored in each of the storage portions 113 are separated and conveyed one by one by a pickup roller and a separation roller, and each sheet is conveyed along a conveying path, downstream in the conveying direction of the recording medium S by a plurality of conveying roller pairs.

Each sheet of the recording media S is brought into pressed contact with the intermediate transfer member 106 by a transfer roller 114, and simultaneously, a bias opposite to the electric potential of the toners is applied to the sheet by the transfer roller 114, thereby transferring the toner image formed on the intermediate transfer member 106 onto the sheet (secondary transfer).

Around and near the intermediate transfer member 106 are disposed an image formation start position detection sensor 115, a sheet feeding timing sensor 116, and a density sensor 117. The image formation start position detection sensor 115 determines a print start position to form an image. The sheet feeding timing sensor 116 determines the feeding timing of each sheet of the recording media S. The density sensor 117 measures the densities of patches in the control of density. In the control of density, the density sensor 117 measures the densities of patches formed on the intermediate transfer member 106 by the image forming units 120Y, 120M, 120C, and 120K.

Then, the sheet with the toner image transferred by the transfer roller 114 thereon is conveyed to a first fixing unit 150. The first fixing unit 150 includes a fixing roller 151 to apply heat to the sheet, a pressure belt 152 to bring the sheet into pressed contact with the fixing roller 151, and a post-fixing sensor 153 to detect the sheet being discharged from the first fixing unit 150. The fixing roller 151 is a hollow roller and includes a heater inside. The fixing roller 151 is configured to be rotationally driven to simultaneously convey the sheet together with the pressure belt 152.

In the present exemplary embodiment, a second fixing unit 160 is included downstream of the first fixing unit 150 in the conveying direction of the recording media S. The second fixing unit 160 is disposed to add gloss to the toner image on the sheet fixed by the first fixing unit 150 and ensure fixability. The second fixing unit 160 is configured similarly to that of the first fixing unit 150 and includes a fixing roller 161, a pressure roller 162, and a post-fixing sensor 163.

Here some types of sheets of the recording media S stored in the storage portions 113 are not sent through the second fixing unit 160. To reduce energy consumption, a conveying path 130 is provided to convey these types of sheets of the recording media S without going through the second fixing unit 160. These types of sheets of the recording media S are conveyed to the conveying path 130 by a conveying path switching flapper 131 switching to the conveying path 130 as these types of sheets of the recording media S are discharged from the first fixing unit 150.

Subsequently, the sheet is conveyed into a conveying path 135 by a conveying path switching flapper 132. The sheet being conveyed along the conveying path 135 is conveyed up to a reverse unit 136. Upon the detection of the trailing edge of the sheet upstream in the conveying path by a reverse sensor 137, a flapper 133 is switched, so that the sheet is conveyed into a reverse conveying path 138.

What had been the trailing edge of the sheet is now the leading edge of the sheet in the conveying direction. The sheet is conveyed with its surface provided with the formed image thereon faced up. The front side and the back side of each sheet of the recording media S is turned upside down by the reverse unit 136.

Then, the sheet with the front and back sides upside down reaches a nip portion between the transfer roller 114 and the intermediate transfer member 106, which is a secondary transfer position, again. At this time, as the side of the sheet opposed to the intermediate transfer member 106 is on the opposite side of the side with the previously formed image, a toner image is formed on that back side. Then, the sheet passes through again the first fixing unit 150 and the second fixing unit 160, thereby fixing the toner image formed on the back side. Thus, the toner images are formed on both sides of the sheet of the recording media S.

The sheet of the recording media S with the images formed on both sides passes through a discharge conveying path 139 and is discharged out of the image forming apparatus 100. If only one side is used to form an image thereon, the image is formed on one side, and then, the sheet is sent via the conveying path switching flapper 132 into the discharge conveying path 139 and discharged out of the image forming apparatus 100. If a sheet provided with an image on one side is discharged out of the image forming apparatus 100 after the front and back sides are turned upside down, the sheet is sent via the conveying path switching flapper 132 into the conveying path 135. After that, the sheet is switched to and sent along the discharge conveying path 139 by a conveying path switching flapper 134.

Each sheet of the recording media S with an image on one side or images on both sides formed by the image forming apparatus 100 is conveyed into the image reading apparatus 400 connected to the image forming apparatus 100 downstream in the conveying direction of the recording media S. A detailed configuration of the image reading apparatus 400 will be described with reference to FIG. 2.

Each sheet of the recording media S that has passed through the image reading apparatus 400 is conveyed into the processing apparatus 600, in which a binding process and a punching process can be operated on the sheet by a stapler unit and a punch unit (not illustrated), respectively. Then, the sheet subjected to processing by the processing apparatus 600 is discharged onto a discharge tray 601a or 601b.

Figure 2:
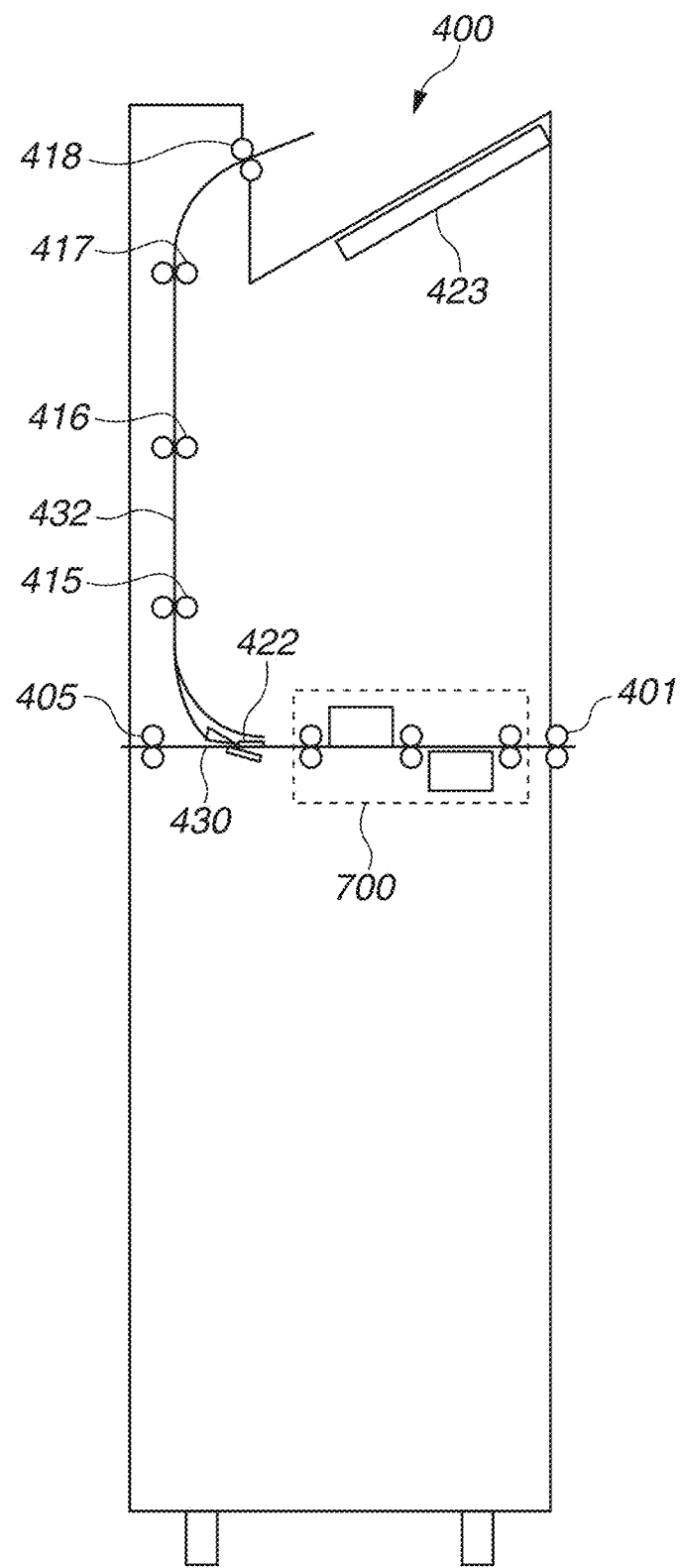
FIG. 2 is a schematic cross-sectional view of an image reading apparatus.

The image reading apparatus 400 according to the present exemplary embodiment will be described. FIG. 2 is a schematic cross-sectional view of the image reading apparatus 400. The image reading apparatus 400 is an apparatus to read image information about images formed on the recording media S by the image forming apparatus 100 and outputs the reading results to a control unit (not illustrated) of the image forming apparatus 100. The control unit (not illustrated) of the image forming apparatus 100 can detect differences in positions of images on the first side (the front side) and the second side (the back side) corresponding to the opposite side of the first side, the positions of which are relative to the leading edge of each sheet, and adjust an image formation timing to reduce the differences in the positions of the images. To provide such an adjustment, the image reading apparatus 400 includes a reading unit 700 to read the shapes of the recording media S and the image information about the images on the recording media S.

The image reading apparatus 400 include an entrance conveying roller pair 401 to receive and convey the recording media S discharged from the image forming apparatus 100, the reading unit 700, and a branch flapper 422 provided along the conveying direction of the recording media S. The entrance conveying roller pair 401 conveys the recording media S conveyed from the image forming apparatus 100 to the reading unit 700. The entrance conveying roller pair 401 is an example of a conveying unit.

The branch flapper 422 is configured to switch the conveying path to a through path 430 for conveying the recording media S having passed through the reading unit 700 from the image reading apparatus 400 to the processing apparatus 600, or to a discharge path 432 for discharging the recording media S onto a fixed tray 423 provided on the top surface of the image reading apparatus 400.

If the recording media S are sent to the through path 430, the branch flapper 422 is moved to the upper position. Then, the recording media S are discharged out of the image reading apparatus 400 by an exit conveying roller 405 and transferred to the processing apparatus 600. The exit conveying roller 405 is an example of a discharge unit.

If the recording media S are conveyed along the discharge path 432, the branch flapper 422 is moved to the lower position. The recording media S are discharged onto the fixed tray 423 by a plurality of conveying roller pairs 415, 416, 417, and 418.

Figure 3:
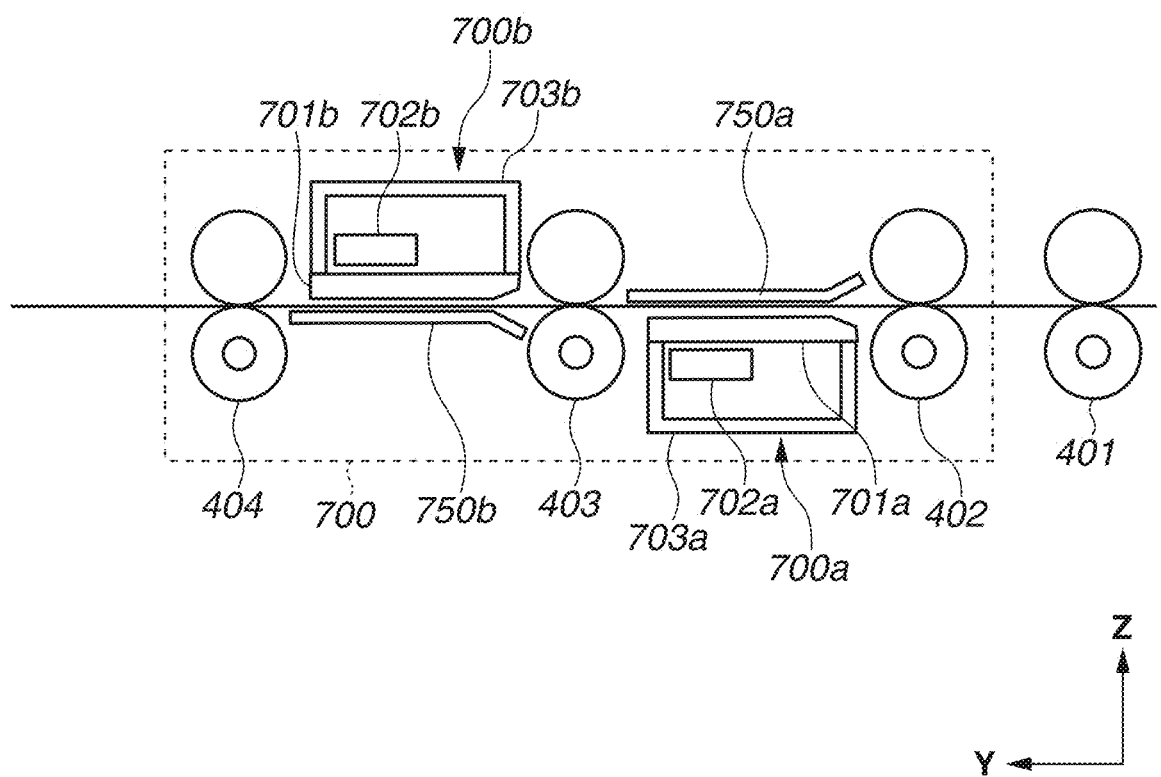
FIG. 3 is a schematic cross-sectional view of a reading unit.

With reference to FIG. 3, a detailed configuration of the reading unit 700 will be described. FIG. 3 is a schematic cross-sectional view illustrating the detailed configuration of the reading unit 700. As described above, to output reading results corresponding to image information about images formed on the recording media S to the image forming apparatus 100, the reading unit 700 acquires the shapes of the recording media S and the image information about the images on the recording media S.

The reading unit 700 can read measurement test patterns formed on the front and back sides of sheets of the recording media S. In reading them, the reading unit 700 uses a first reading unit 700a and a second reading unit 700b provided on the opposite side of the first reading unit 700a with respect to the conveying path. Such an arrangement of the first reading unit 700a and the second reading unit 700b allows images on both sides to be being read as the sheet is being conveyed, which reduces reading time on both sides of each sheet.

In the present exemplary embodiment, with images formed on both sides of a sheet, the first reading unit 700a reads the back side and the second reading unit 700b reads the front side. The front side is a side opposed to the intermediate transfer member 106 while the sheet is passing through the secondary transfer portion for the first time. The back side is a side opposed to the intermediate transfer member 106 while the sheet is passing through the secondary transfer portion for the second time.

The reading unit 700 includes a conveying roller pair 402 between the entrance conveying roller pair 401 and the first reading unit 700a in the conveying direction of the recording media S, a conveying roller pair 403 between the first reading unit 700a and the second reading unit 700b, and a conveying roller pair 404 between the second reading unit 700b and the branch flapper 422.

In the reading unit 700, the first reading unit 700a and the second reading unit 700b read image information about images on the recording media S in pressed contact with and conveyed by the conveying roller pairs 402, 403, and 404 rotationally driven by a driving unit (not illustrated). This prevents the fluttering of the trailing edges of the recording media S being conveyed, allowing the first reading unit 700a and the second reading unit 700b to read images well.

The first reading unit 700a includes a transparent member 701a, which doubles as a conveyance guide, a contact image sensor (hereinafter referred to as "CIS") 702a as a reading sensor to read image information about images on the recording media S being conveyed through the transparent member 701a, and a housing 703a, which defines an accommodation space with the transparent member 701a to contain the CIS 702a. In the present exemplary embodiment, the transparent member 701a is made of glass.

At a position opposed to the transparent member 701a in the conveying path is provided a guide member 750a, which forms a conveying path together with the transparent member 701a. The guide member 750a is black to maximize the contrast with the colors of the trailing edges of the recording media S.

The thickness of the transparent member 701a, the distance between the CIS 702a and the transparent member 701a, and the distance between the transparent member 701a and the guide member 750a are set so that the recording media S pass at the focal position of the CIS 702a.

As with the first reading unit 700a, the second reading unit 700b includes a transparent member 701b, which doubles as a conveyance guide, a CIS 702b to read image information about images on the recording media S being conveyed through the transparent member 701b, and a housing 703b, which defines an accommodation space with the transparent member 701b to contain the CIS 702b. The transparent member 701b is also made of glass.

At a position opposed to the transparent member 701b in the conveying path is provided a guide member 750b, which forms a conveying path together with the transparent member 701b. The guide member 750b is black to maximize the contrast with the colors of the trailing edges of the recording media S.

As described above, the first reading unit 700a and the guide member 750a are configured similar to the second reading unit 700b and the guide member 750b, respectively, these pairs of which are disposed in inverted position with respect to the conveying path. This disposition allows the reading unit 700 to read images on the first and second sides of the recording media S while the recording media S are being conveyed in a single direction (the direction from the right side to the left side in FIG. 3).

The reading unit 700 according to the present exemplary embodiment is configured in which the first reading unit 700a is provided upstream of the second reading unit 700b in the conveying direction of the recording media S. Alternatively, the second reading unit 700b may be disposed upstream of the first reading unit 700a so long as image information about images on both sides of the recording media S can be acquired in a single conveyance direction.

Next, with reference to FIGS. 4 to 6, the internal configurations of the first reading unit 700a and the second reading unit 700b will be described. The first reading unit 700a is configured similarly to the second reading unit 700b except for orientation of disposition only. Thus, the following is a description of the internal configuration of the first reading unit 700a only, and a description of that of the second reading unit 700b will be omitted.

Figure 4:
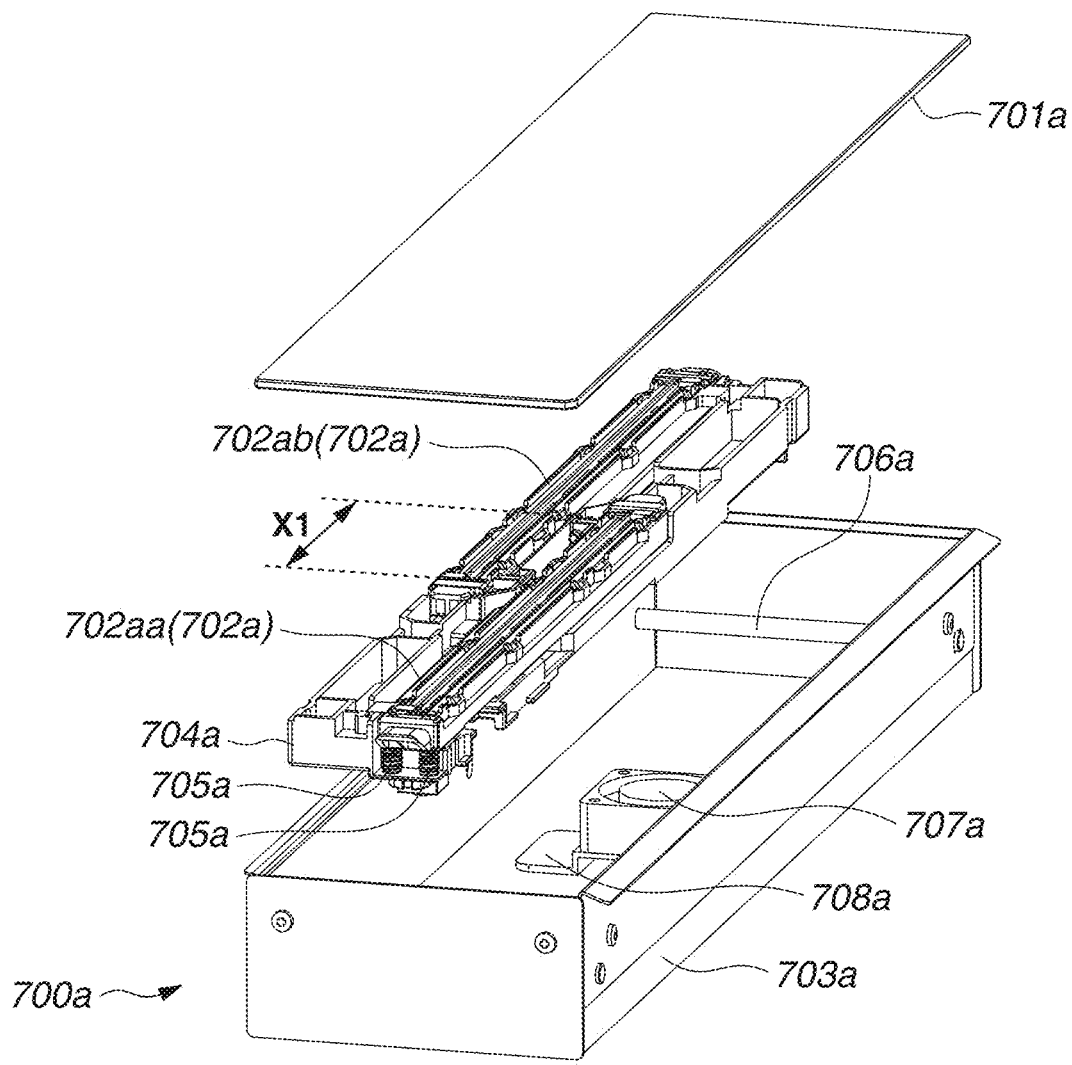
FIG. 4 is an exploded perspective view of the reading unit.

FIG. 4 is an exploded perspective view of the first reading unit 700a. In FIG. 4, the direction of an arrow X corresponds to the width direction of the recording media S conveyed and also the scanning direction of the CIS 702a. The direction of the arrow X is also a direction orthogonal to the conveying direction and the vertical direction of the recording media S. FIG. 5 is a schematic cross-sectional view of an X-cross section of the first reading unit 700a. FIG. 6 is a schematic cross-sectional view of a Y-cross section of the first reading unit 700a. In FIGS. 4 and 5, the direction of an arrow Y is the conveying direction of the recording media S.

As described above, the first reading unit 700a includes the transparent member 701a and the housing 703a, and the CIS 702a is accommodated in the space defined by the transparent member 701a and the housing 703a.

In the present exemplary embodiment, the first reading unit 700a includes the CIS 702a, which contains a first CIS 702aa and a second CIS 702ab in small sizes, two in total. The first CIS 702aa and the second CIS 702ab are held in a CIS holder 704a as a holding member.

In the present exemplary embodiment, the first CIS 702aa and the second CIS 702ab are not simply arranged in the X direction in the CIS holder 704a, but are placed so that, viewed from the Y-direction, the first CIS 702aa and the second CIS 702ab overlap each other in the X direction, which forms a overlap portion X1.

With no overlap X1 provided in the arrow X direction, a region where images on the recording media S cannot be read at and around the center of the X direction can be created due to part attachment error or manufacturing error. The overlap X1 prevents the creation of such a region.

Thus, in the present exemplary embodiment, the first CIS 702aa and the second CIS 702ab acquire image information in the overlap portion X1 as the same area of the recording media S, allowing the entire area of the images in the X direction on the recording media S being conveyed even with the first reading unit 700a, which includes two CISs placed next to each other, to be read.

The distance between one end portion of the first CIS 702aa as one end of the width direction (the direction of the arrow X) of the recording media S conveyed and one end portion of the second CIS 702ab as the other end of the width is provided so that the first CIS 702aa and the second CIS 720ab can read the entire area in the width direction of the recording media S in the maximum size that can be passed in the image reading apparatus 400. In other words, reading by the first CIS 702aa and the second CIS 702ab can cover the entire area in the width direction of the recording media S in the maximum size that can be passed in the image reading apparatus 400.

The first CIS 702aa includes two biasing springs 705a as biasing members provided near the end portion in the −X direction. In addition, two other biasing springs similar to the biasing springs 705aa are provided near the end portion in the +X direction of the first CIS 702aa, not illustrated in FIG. 4. The total four biasing springs 705a each bias the first CIS 702aa in the direction from the CIS holder 704a toward the transparent member 701a (the direction of an arrow Z). Thus, the first CIS 702aa is biased at both end portions in the direction of the arrow X in the direction from the CIS holder 704a toward the transparent member 701a.

Figure 6:
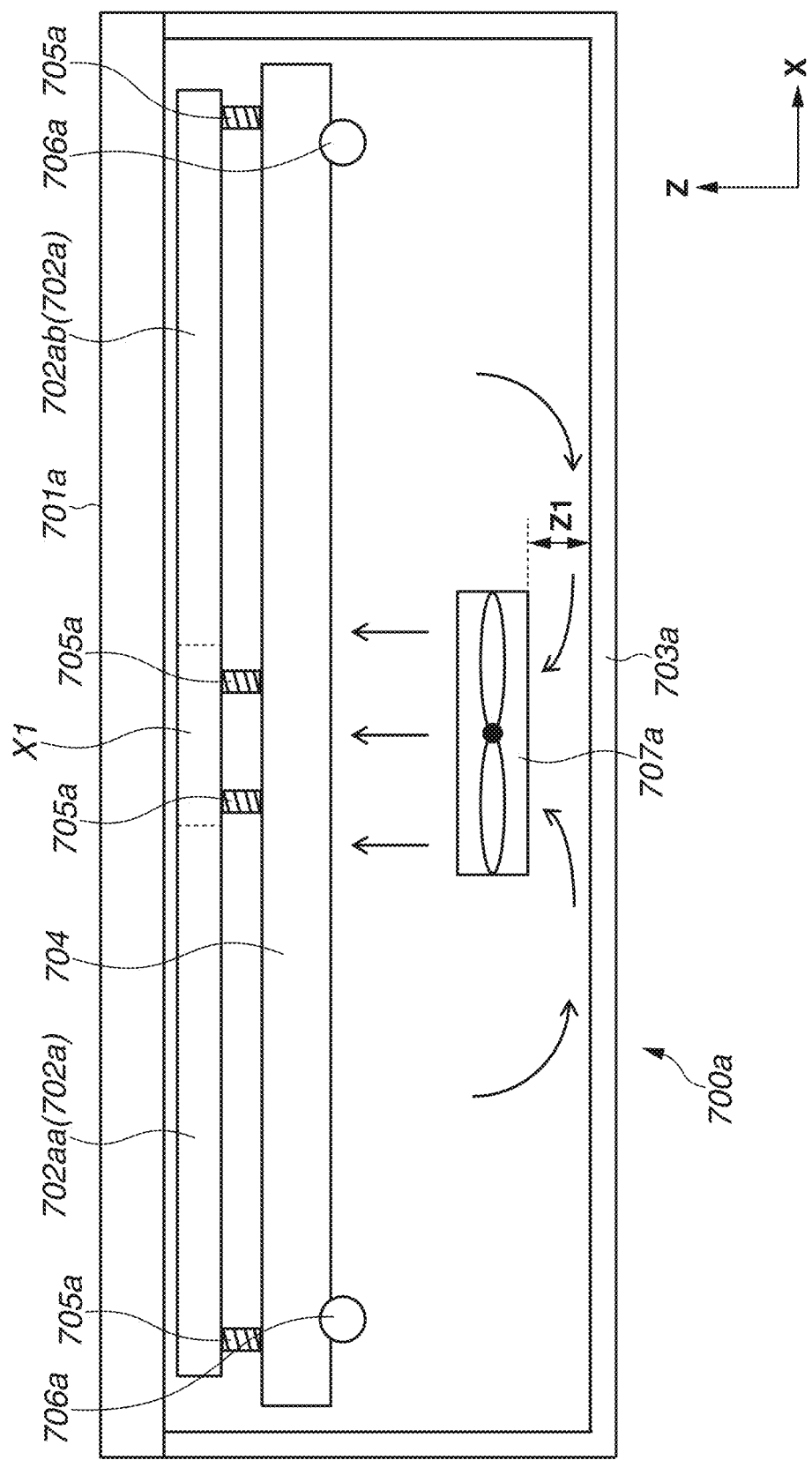
FIG. 6 is a schematic cross-sectional view of a Y-cross section of the reading unit.

As illustrated in FIG. 6, similarly to the first CIS 702aa, the second CIS 702ab includes two biasing springs 705a provided at both end portions in the X direction of it, which bias the second CIS 702ab in the direction from the CIS holder 704a toward the transparent member 701a.

In the present exemplary embodiment, the first CIS 702aa and the second CIS 702ab each have its biasing springs that urge the CIS holder 704a. However, not limited to that configuration, these biasing springs may be provided to urge the first CIS 702aa and the second CIS 702ab against the transparent member 701a from the CIS holder 704a. For example, a housing may be provided that accommodates the first CIS 702aa and the second CIS 702ab and that is biased from the CIS holder 704a toward the transparent member 701a by springs. This reduces the number of biasing springs compared with the configuration that urges the first CIS 702aa and the second CIS 702ab separately against the CIS holder 704a.

The first reading unit 700a also includes holding shafts 706a that support the CIS holder 704a movably in the ±Y-direction indicated by the arrow relative to the housing 703a. As illustrated in FIG. 6, the CIS holder 704a is supported by total two holding shafts 706a at both end portions in the X direction, one of which is provided at the end portion of the housing 703a in the +X direction, the other of which is provided at the end portion of the housing 703a in the −X direction.

Figure 5:
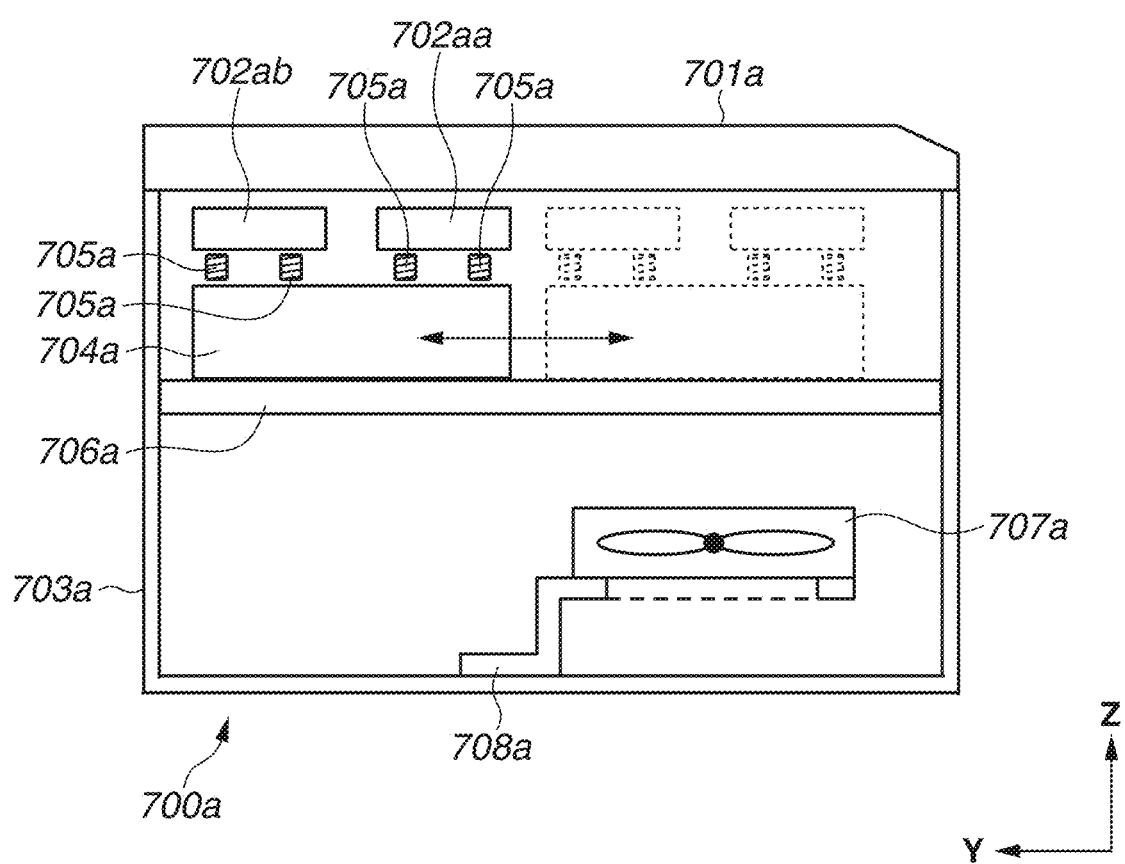
FIG. 5 is a schematic cross-sectional view of an X-cross section of the reading unit.

The above-mentioned configuration allows the CIS holder 704a to be driven by a slide movement mechanism (not illustrated) to move in the ±Y-direction relative to the housing 703a as illustrated in FIG. 5. In FIG. 5, the CIS holder 704a, which has moved, is indicated by a dashed line. In other words, supporting the CIS holder 704a slidably by the holding shafts 706a allows the CIS holder 704a to be moved in the ±Y-direction in the accommodation space defined by the transparent member 701a and the housing 703a.

The CIS holder 704a is thus slid in the housing 703a to a reading position to read a white reference plate to acquire a reference value for use in shading correction. In the present exemplary embodiment, the white reference plate (not illustrated) is provided on the surface of the transparent member 701a over which the recording media S pass. The reading position to acquire a reference value for use in shading correction is a position where the first CIS 702aa and the second CIS 702ab can read the white reference plate.

The first CIS 702aa and the second CIS 702ab indicated by solid lines in FIG. 5 are positioned at the reading position to read the recording media S. Those indicated by dashed lines are positioned at the acquisition position to read the white reference plate to acquire the reference value. The CIS holder 704a moves from the reading position to the acquisition position at predetermined time intervals calculated based on a cumulative number of read sheets, and then the first CIS 702aa and the second CIS 702ab read the white reference plate and perform shading correction.

With the first CIS 702aa and the second CIS 702ab thus disposed, a light source such as a light-emitting diode (LED) or an integrated circuit (IC) chip such as an analog front end (AFE) may heat during a reading operation. Such heat impact on the first CIS 702aa and the second CIS 702ab can expand light guiding members or sensors included in the first CIS 702aa and the second CIS 702ab, making it difficult to acquire reading results with accuracy.

In the present exemplary embodiment, to prevent heat from being left near the first CIS 702aa and the second CIS 702ab in the space defined by the housing 703a and the transparent member 701a, an axial flow fan 707a is included. The axial flow fan 707a is fixed near the center in the X direction in the housing 703a by a fan support plate 708a as a supporting member.

FIG. 6 is a schematic cross-sectional view of a Y-cross section illustrating an air current generated by the axial flow fan 707a. In FIG. 6, the fan support plate 708a is omitted. As illustrated in FIG. 6, the axial flow fan 707a is fixed by the fan support plate 708a spaced apart by a gap Z1 between the bottom surface of the housing 703a and the air intake surface of the axial flow fan 707a. In the present exemplary embodiment, the gap Z1 of which is 20 mm.

The gap Z1 provided allows the axial flow fan 707a to take in air from its surface opposed to the bottom surface of the housing 703a and generate an air current to exhaust the air in the Z-direction toward the CIS holder 704a. Thus, the axial flow fan 707a circulates air in the space defined by the housing 703a and the transparent member 701a.

The air circulation in the space prevents heat from staying near the first CIS 702aa and the second CIS 702ab even if the first CIS 702aa and the second CIS 702ab as the CIS 702a heat up. This therefore prevents reading results from being inaccurate caused by heated light guiding members or sensors in the first CIS 702aa and the second CIS 702ab.

In the present exemplary embodiment, the space that accommodates the first CIS 702aa and the second CIS 702ab is substantially sealed by the housing 703a being fixed to the transparent member 701a with double sided tape, preventing foreign matter such as dust and dirt from adversely affecting the accuracy of reading by the first CIS 702aa and the second CIS 702ab.

Alternatively, an opening may be provided in the housing 703a to lead though connection lines connecting a controller board (not illustrated) to the first CIS 702aa, the second CIS 702ab, the axial flow fan 707a, and other components. In the present exemplary embodiment, the term "substantially sealed space" is taken to include a configuration that has an opening for leading through above-mentioned connection lines and/or a tiny hole such as an opening for tightening a screw.

As described above, similarly to the configuration of the first reading unit 700a, the second reading unit 700b also includes an axial flow fan 707b in a similar configuration, thereby preventing heat from staying near the CIS 702b in the second reading unit 700b.

Figure 7:
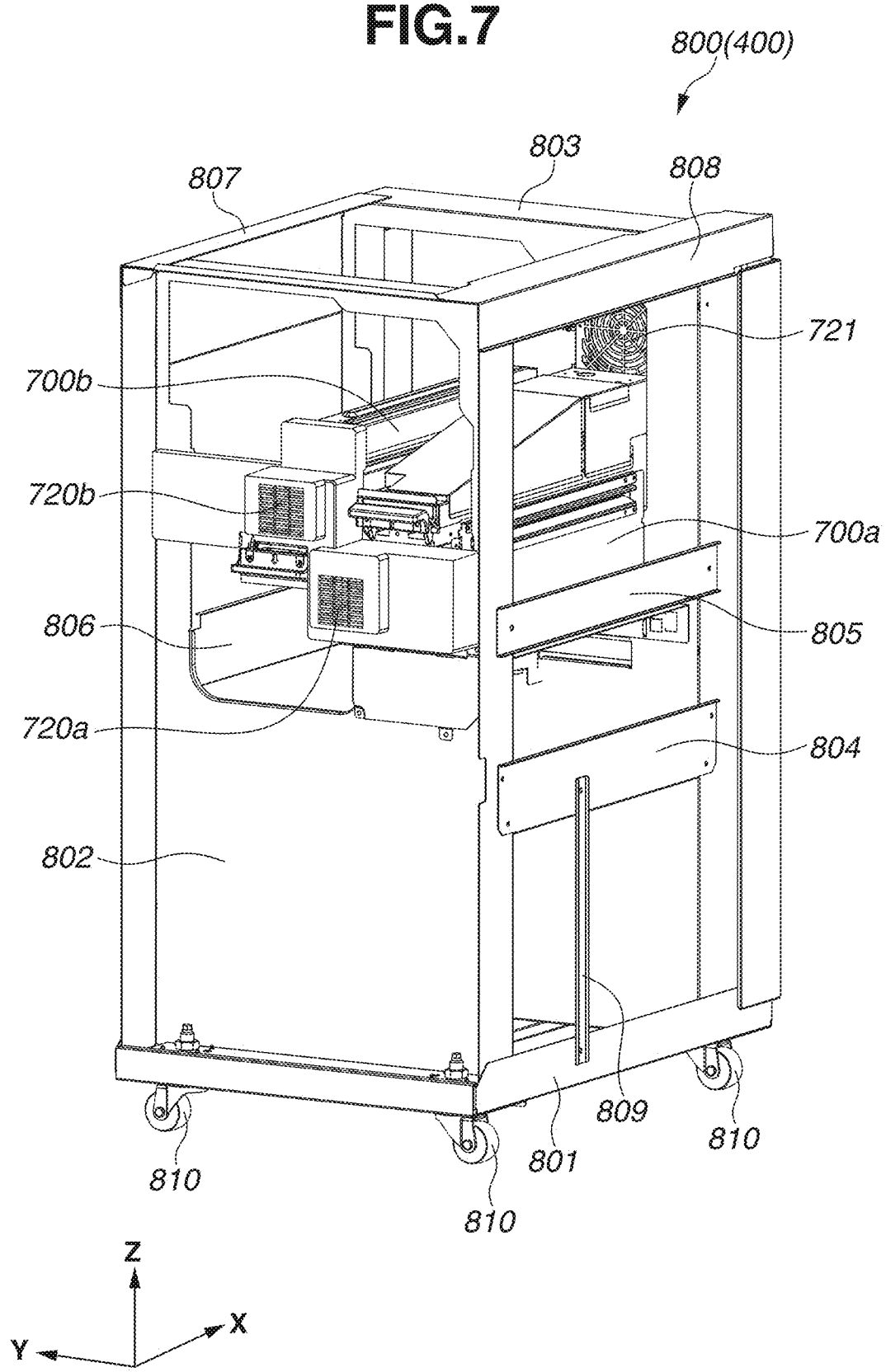
FIG. 7 is a perspective view of a support frame member of the image reading apparatus.
Figure 8:
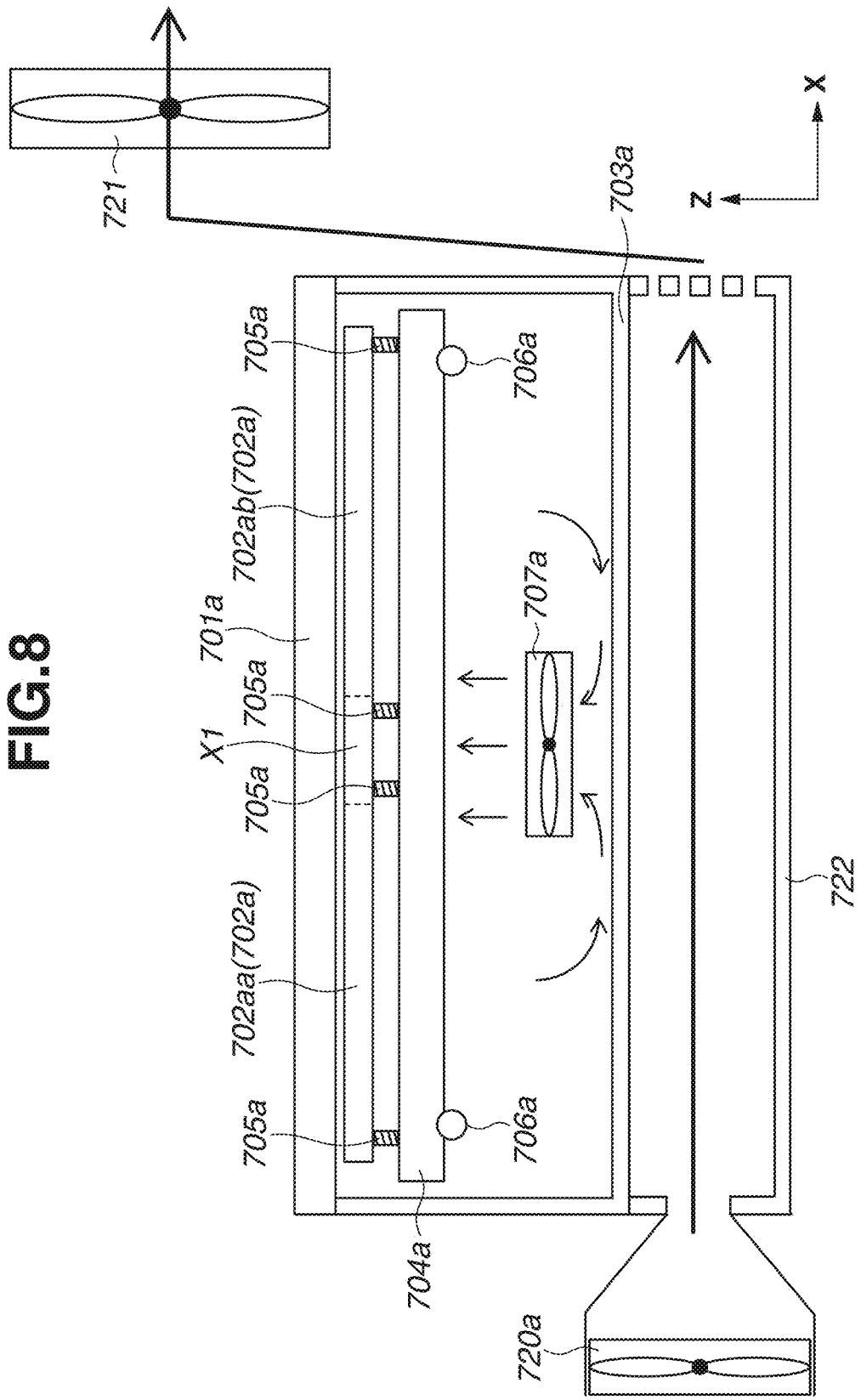
FIG. 8 is a schematic cross-sectional view illustrating an air flow near the reading unit.
Figure 9:
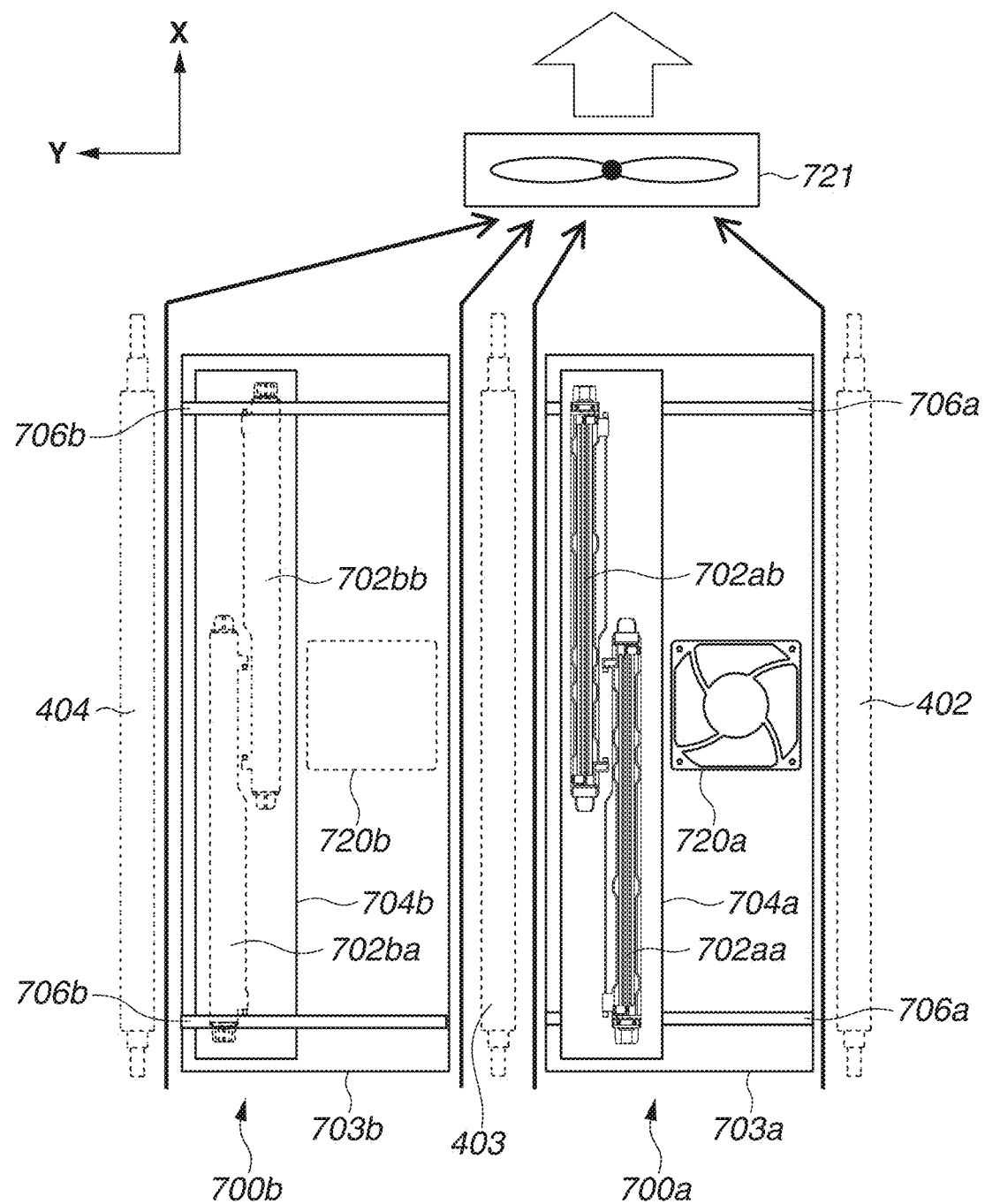
FIG. 9 is a schematic cross-sectional view illustrating air flows near the reading unit.

Next, an air flow in the image reading apparatus 400 according to the present exemplary embodiment will be described with reference to FIGS. 7 to 10. FIG. 7 is a perspective view of a support frame member 800 of the image reading apparatus 400. FIG. 8 is a schematic cross-sectional view of a Y-cross section illustrating an air flow near the first reading unit 700a. FIG. 9 is a schematic cross-sectional view of a Z-cross section illustrating air flows near the reading unit 700.

First, the configuration of the support frame member 800 of the image reading apparatus 400 will be described with reference to FIG. 7. FIG. 7 is a diagram with all the exterior covers are removed. As illustrated in FIG. 7, the support frame member 800 of the image reading apparatus 400 includes a bottom plate 801 provided with a plurality of casters 810, a front side plate 802 located near the front of the image reading apparatus 400, and a back side plate 803 located near the back of the image reading apparatus 400. The term "the front of the image reading apparatus 400" means the side surface provided with a front cover (not illustrated), and opening the front cover allows a user to access inside when a conveyance abnormality (so-called, a paper jam) of a sheet of the recording media S occurs.

The front side plate 802 and the back side plate 803 are fixed by a plurality of stays 804, 805, 806, 807, and 808 at predetermined distances. The support frame member 800 of the image reading apparatus 400 is thus composed of the bottom plate 801, the front side plate 802, the back side plate 803, and the plurality of stays 804 to 808.

Then, the reading unit 700 is supported and fixed by the front side plate 802 and the back side plate 803. The reading unit 700 performs communication using a control unit (not illustrated) to read image information or transmit image data to an external control unit. To reduce the influence of noise in such communication, a noise removal metal plate 809 is fixed to the support frame member 800. This causes the support frame member 80 to be grounded via the bottom plate 801, preventing the influence of generated noise on the reading unit 700.

In the present exemplary embodiment, to enhance the cooling effects of the axial flow fans 707a and 707b in the first reading unit 700a and the second reading unit 700b, respectively, front surface side axial flow fans 720a and 720b are provided in the front side plate 802, and a back surface side axial flow fan 721 is provided in the back side plate 803. As a result, the image reading apparatus 400 is equipped with the font surface side axial flow fans 720a and 720b as air intake fans in the direction from the front surface to the back surface of the apparatus and further with the back surface side axial flow fan 721 as an air exhaust fan nearer the back surface than the first reading unit 700a and the second reading unit 700b.

As illustrated in FIG. 8, the front surface side axial flow fan 720a causes air to flow in from an air intake port (not illustrated) provided in the image reading apparatus 400, producing an air current in the X direction in a duct 722 provided in the bottom of the housing 703a of the first reading unit 700a. Then, the back surface side axial flow fan 721 exhausts the air from an air exhaust port (not illustrated) provided nearer the back surface of the image reading apparatus 400. Similarly, the front surface side axial flow fan 720b also produces an air current in the X direction in a duct (not illustrated) provided in the bottom of the housing 703b of the second reading unit 700b. Then, the back surface side axial flow fan 721 exhausts the air that has passed through the bottom of the housing 703b of the second reading unit 700b out of the apparatus. The back surface side axial flow fan 721 is a fan to exhaust air and heat from the entirety of the image reading apparatus 400. In the present exemplary embodiment, the axial flow fans 707a and 707b each are a 40 millimeter square axial flow fan, the front surface side axial flow fans 720a and 720b each is a 60 millimeter square axial flow fan, and the back surface side axial flow fan 721 is a 120 millimeter square axial flow fan.

The air taken in from the front surface side axial flow fans 720a and 720b not only passes through inside the ducts in the bottoms of the housings 703a and 703b as illustrated in FIG. 8, but also passes through side surfaces of the housings 703a and 703b as illustrated in FIG. 9, and is exhausted by the back surface side axial flow fan 721. The second reading unit 700b and the conveying roller pairs 402, 403, and 404 are indicated by dashed lines in FIG. 9 illustrating a cross-sectional view of a Z-cross section of the first reading unit 700a.

The air flow thus generated by the front surface side axial flow fan 720a and the back surface side axial flow fan 721 indirectly lowers the temperature in the accommodation space containing the CIS 702a with the housing 703a. Further, in the present exemplary embodiment, the housing 703a is made of metal, which is more subject to the influence of the air flow produced by the front surface side axial flow fan 720a and the back surface side axial flow fan 721.

Figure 10:
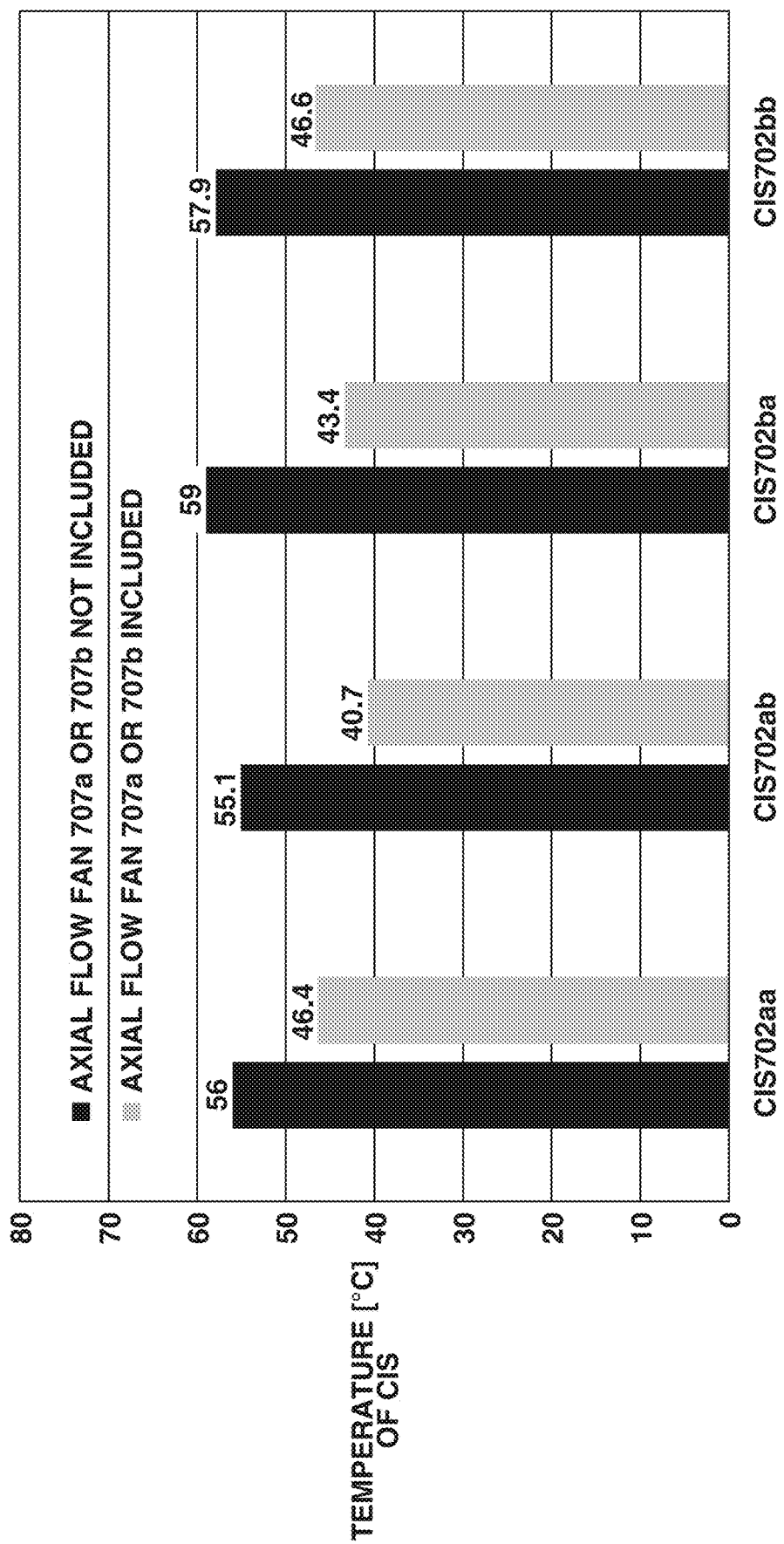
FIG. 10 is a graph illustrating effects with and without an axial flow fan.

Next, the effects of the present exemplary embodiment will be described with reference to FIG. 10. FIG. 10 is a graph illustrating temperature differences in individual CISs in the first reading unit 700a and the second reading unit 700b with and without the axial flow fan 707a and 707b, respectively.

FIG. 10 shows differences in the first CIS 702aa and the second CIS 702ab with and without the axial flow fan 707a, and difference in a third CIS 702ba and a fourth CIS 702bb provided in the second reading unit 700b with and without the axial flow fan 707b.

The first CIS 702aa in the CIS 702a of the first reading unit 700a had a temperature of 56° C. without the axial flow fan 707a, and on the other hand, had a temperature of 46.4° C. with the axial flow fan 707a. The effect of lowering the temperature hence was 9.6° C.

The second CIS 702ab in the CIS 702a of the first reading unit 700a had a temperature of 55.1° C. without the axial flow fan 707a, and on the other hand, had a temperature of 40.7° C. with the axial flow fan 707a. The effect of lowering the temperature was 14.4° C.

The third CIS 702ba in the CIS 702b of the second reading unit 700b had a temperature of 59° C. without the axial flow fan 707b, and on the other hand, had a temperature of 43.4° C. with the axial flow fan 707b. The effect of lowering the temperature was 15.6° C.

The fourth CIS 702bb in the CIS 702b of the second reading unit 700b had a temperature of 57.9° C. without the axial flow fan 707b, and on the other hand, had a temperature of 46.6° C. with the axial flow fan 707b. The effect of lowering the temperature was 11.3° C.

As described above, with the axial flow fan 707a in the first reading unit 700a and with the axial flow fan 707b in the second reading unit 700b, the temperatures of the CISs inside the first reading unit 700a and the second reading unit 700b were lowered by about 12.7° C. on average. That means that, a configuration provided with the axial flow fans 707a and 707b allows reduction in increasing temperatures of the CISs 702a and 702b due to heat left near the CISs 702a and 702b of the first reading unit 700a and the second reading unit 700b.

This prevents a failure in reading results caused by the expansion of light guiding members or sensors in the CISs included in the first reading unit 700a and the second reading unit 700b due to heat. Consequently, the image forming system 1000 can more accurately perform adjustment control of the image forming apparatus 100 based on reading results obtained by the image reading apparatus 400.

A second exemplary embodiment will be described. In the present exemplary embodiment, a duct portion 714a fixed to the housing 703a only is different compared with the configuration according to the first exemplary embodiment. Thus, the components in the first exemplary embodiment are indicated by the reference numerals, and redundant descriptions will be omitted.

Figure 11:
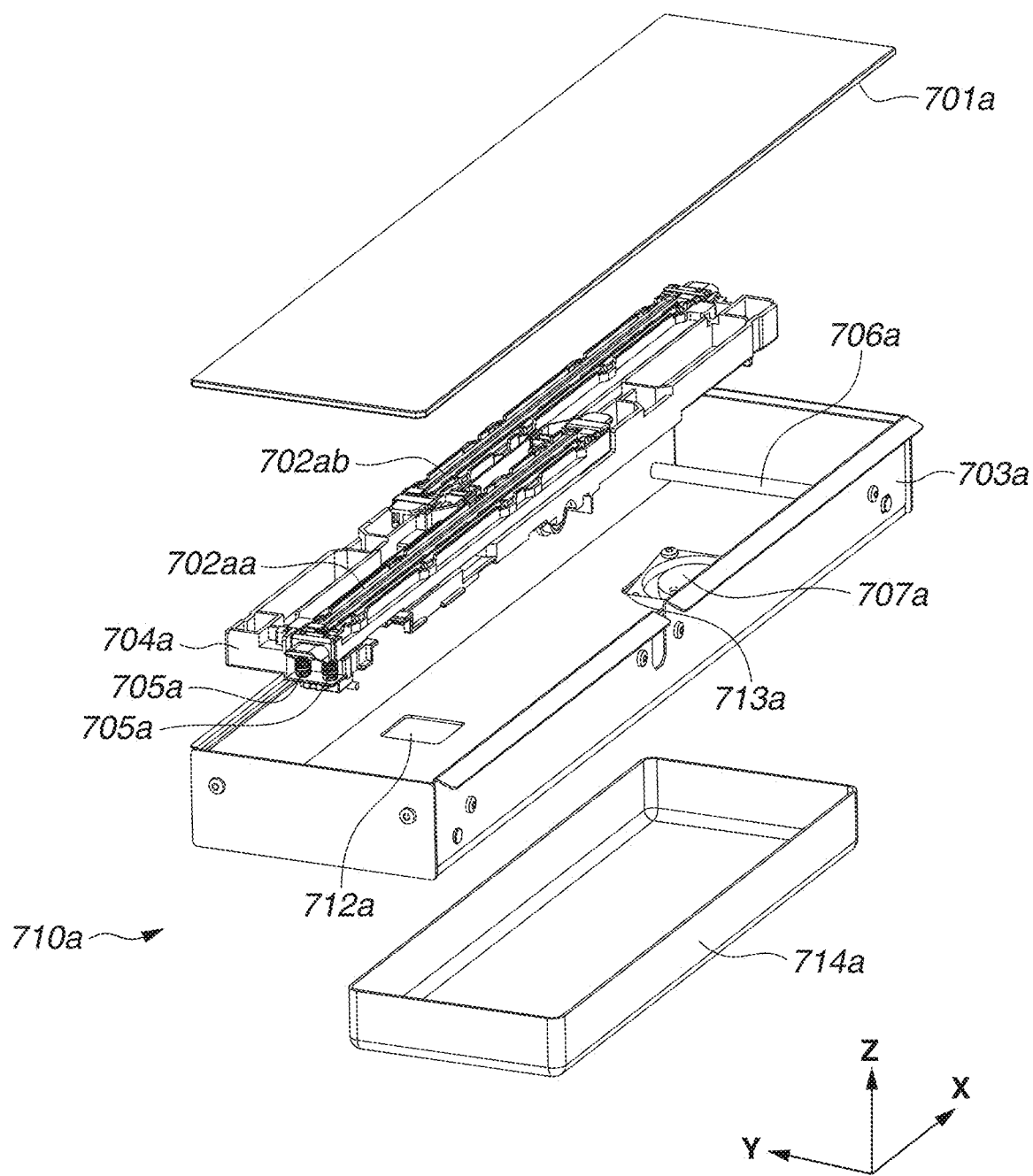
FIG. 11 is an exploded perspective view of a reading unit according to a second exemplary embodiment.
Figure 12:
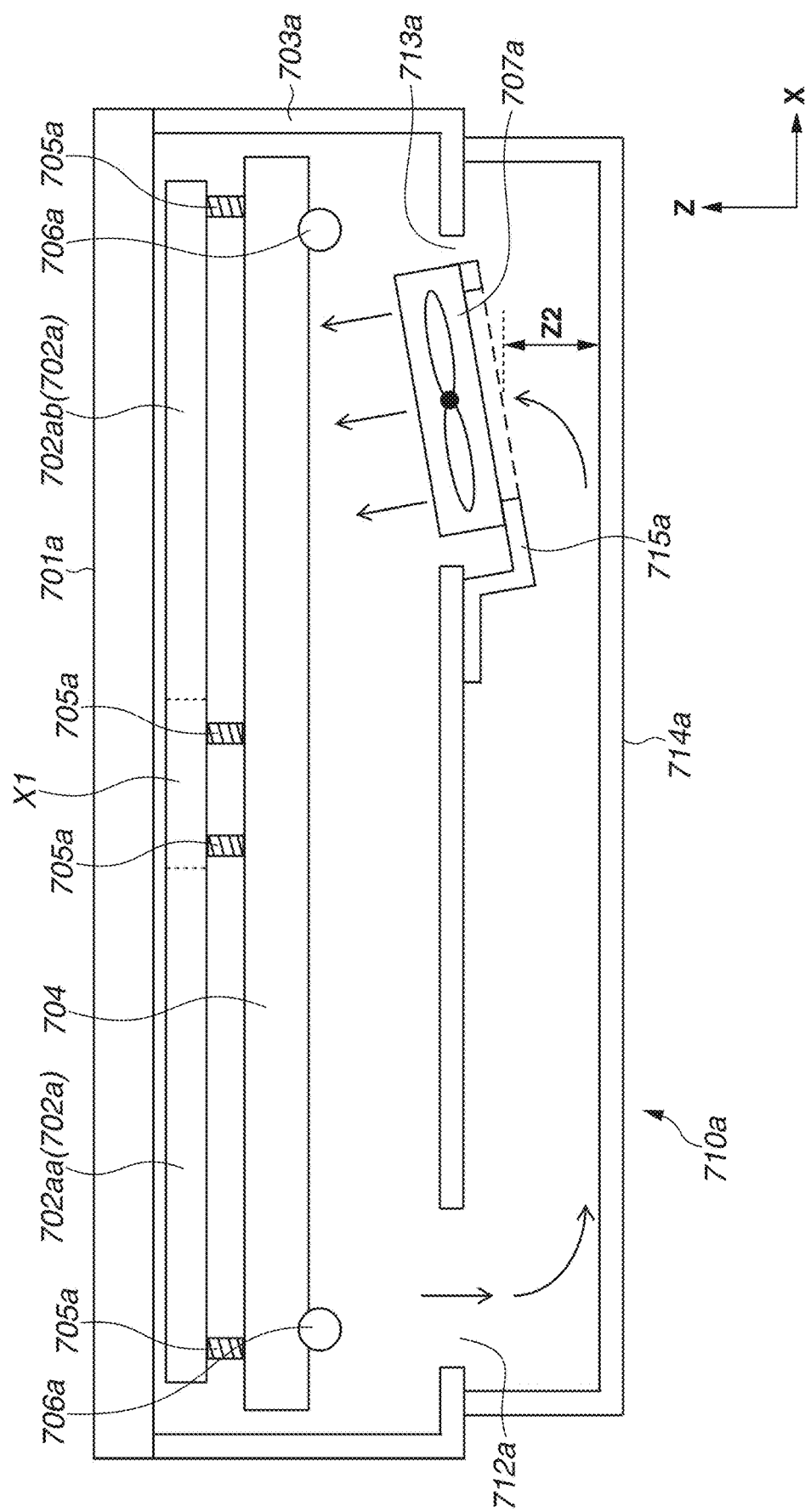
FIG. 12 is a schematic cross-sectional view of the reading unit according to the second exemplary embodiment.

FIG. 11 is an exploded perspective view of the first reading unit 700a according to the second exemplary embodiment. FIG. 12 is a schematic cross-sectional view of a Y-cross section of the first reading unit 700a according to the second exemplary embodiment.

In the present exemplary embodiment, in addition to the housing 703a described in the first exemplary embodiment, a duct portion 714a fixed to the housing 703a is included. The housing 703a includes two communication ports 712a and 713a, which communicate with the space defined by the duct portion 714a and the housing 703a.

The communication port 712a is provided at a position closer to the end portion in the −X direction than the center of the housing 703a in the X direction. The communication port 713a is provided at a position closer to the end portion in the +X direction than the center of the housing 703a in the X direction.

The axial flow fan 707a is fixed to the housing 703a at the communication port 713a by a fan support plate 715a as a supporting member. The duct portion 714a is fixed to the housing 703a to cover the two communication ports 712a and 713a, the axial flow fan 707a, and the fan support plate 715a.

In the present exemplary embodiment, reading failure due to the presence of foreign matter such as dust and dirt on the CIS 702a is prevented with a substantially sealed space of the first reading unit 700a thus formed by the transparent member 701a, the housing 703a, and the duct portion 714a. Also in the present exemplary embodiment, similarly to the first exemplary embodiment, the term "substantially sealed space" is taken to include a configuration that has an opening for leading through above-mentioned connection lines and/or a tiny hole such as an opening for tightening a screw.

As illustrated in FIG. 12, the axial flow fan 707a is fixed to the fan support plate 715a with a gap Z2 from the bottom surface of the duct portion 714a. In the present exemplary embodiment, the gap Z2 is 20 mm.

The axial flow fan 707a thus fixed takes in air from the space of the duct portion 714a and produces an air current in the Z-direction toward the inside of the housing 703a. As a result, the axial flow fan 707a produces an air current toward the first CIS 702aa and the second CIS 702ab.

The air current thus produced by the axial flow fan 707a forms an air flow that brings air from the space defined by the duct portion 714a through the communication port 713a into the space defined by the housing 703a and then from the space defined by the housing 703a through the communication port 712a into the space defined by the duct portion 714a.

In other words, the air taken in from the space defined by the duct portion 714a through the communication port 713a into the space defined by the housing 703a passes through the space in the housing 703a and then from the space defined by the housing 703a through the communication port 712a into the space defined by the duct portion 714a. This circulates air in the XZ plane in the first reading unit 700a.

In the present exemplary embodiment, the axial flow fan 707a is inclined with respect to the XY plane, thereby facilitating the movement of the produced air current toward the communication port 712a. This makes it easy to circulate air in the housing 703a and the duct portion 714a.

The axial flow fan 707a may be placed perpendicular or horizontally to the XY plane as long as air inside the housing 703a and the duct portion 714a can be circulated by the axial flow fan 707a.

As described above, in the present exemplary embodiment, air circulated inside the first reading unit 700a by the axial flow fan 707a allows reduction in increasing temperatures of the CIS 702a due to heat left near the CIS 702a.

This prevents a failure in reading results caused by the expansion of light guiding members or sensors in the CIS 702a included in the first reading unit 700a due to heat. Consequently, the image forming system 1000 can more accurately perform adjustment control of the image forming apparatus 100 based on reading results obtained by the image reading apparatus 400.

Although the present exemplary embodiment has been described using the first reading unit 700a as a representative example, the second reading unit 700b may have a similar configuration. Alternatively, the first and second exemplary embodiments may be applied to the first reading unit 700a and the second reading unit 700b, respectively.

A control board of the CIS 702a may be placed in the duct portion 714a as long as air flow inside the duct portion 714a is not blocked by it. Such a configuration allows cooling of the control board as well as air circulation in the first reading unit 700a.

In the present exemplary embodiment, the axial flow fan 707a is fixed to the housing 703a by the fan support plate 715a. Alternatively, the axial flow fan 707a may be fixed to the duct portion 714a.

A third exemplary embodiment will be described. Only a configuration with a filter unit 716a according to the present exemplary embodiment is different from the configuration according to the first exemplary embodiment. The components in the first exemplary embodiment are indicated by the reference numerals, and abundant descriptions will be omitted.

Figure 13:
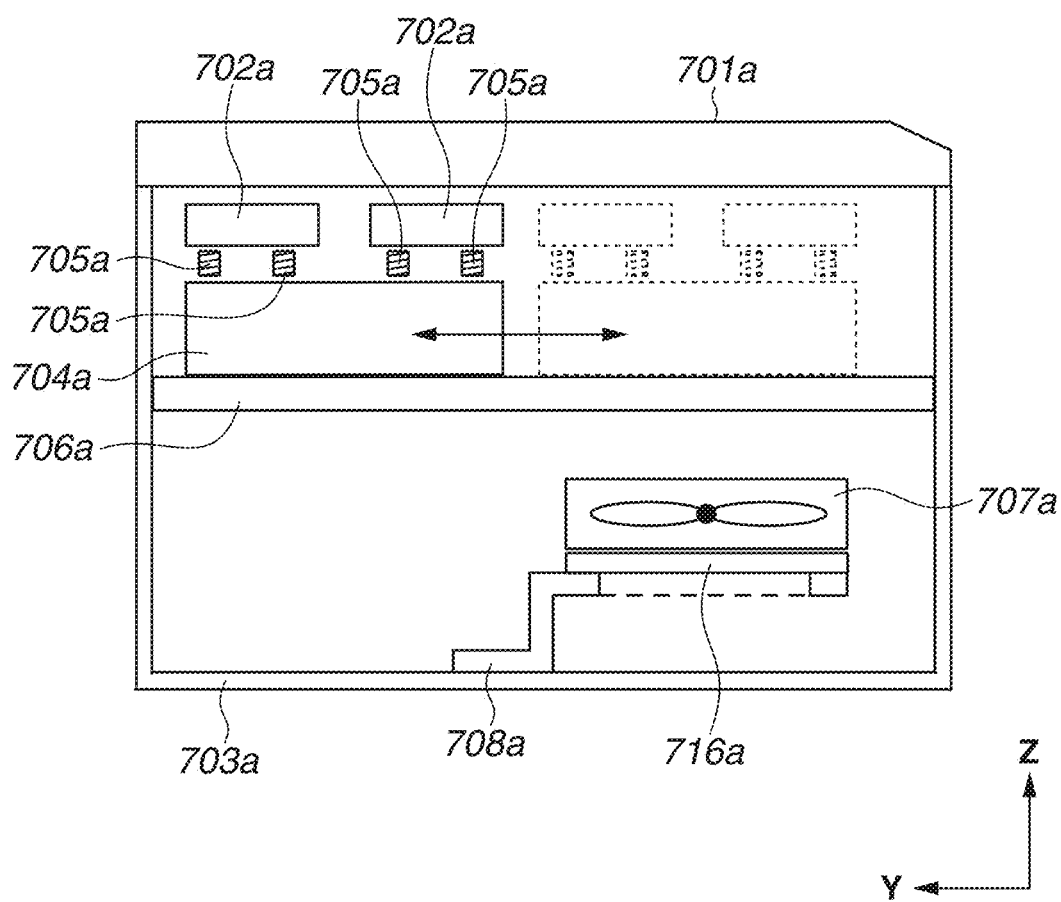
FIG. 13 is a schematic cross-sectional view of a reading unit according to a third exemplary embodiment.

FIG. 13 is a schematic cross-sectional view of an X-cross section of the first reading unit 700a according to the third exemplary embodiment. FIGS. 14A and 14B are diagrams illustrating the configuration of a filter unit 716a. FIG. 14A is a top view of the filter unit 716a, and FIG. 14B is an A-A cross-sectional view of FIG. 14A. In the present exemplary embodiment, the filter unit 716a is included in the air intake port of the axial flow fan 707a. Then, the axial flow fan 707a and the filter unit 716a are fixed to the housing 703a via the fan support plate 708a.

As illustrated in FIGS. 14A and 14B, the filter unit 716a is composed of a filter frame 717a and a filter member 718a. The material of the filter member 718a is non-woven fabric with a thickness of about 0.3 mm using a circular cross-section fiber material with a fiber diameter of 20 to 40 µm. The material of the filter frame 717a is polycarbonate (PC)-acrylonitrile butadiene styrene (ABS) resin. The filter member 718a is molded into a pleated shape, and then the filter unit 716a is integrally molded of the filter member 718a and PC-ABS material in a metal mold.

The filter unit 716a included in such a manner allows air subjected to dust catching via the filter member 718a in the filter unit 716a to circulate inside the first reading unit 700a, even if foreign matter such as dirt and dust that has entered in the production of the first reading unit 700a is in the substantially sealed space in the first reading unit 700a. This prevents a failure in reading due to foreign material such as dirt and dust on the CIS 702a.

In the present exemplary embodiment, an example has been described in which the filter unit 716a is included in the configuration according to the first exemplary embodiment. Alternatively, the filter unit 716a may be included in the configuration according to the second exemplary embodiment. In the present exemplary embodiment, although the first reading unit 700a is used as an example, alternatively, the filter unit 716a may be also included in the second reading unit 700b.

Other Exemplary Embodiments

In the above exemplary embodiments, the first CIS 702aa and the second CIS 702ab read the entire area in the width direction of the recording media S. Alternatively, only a single CIS may be provided in each reading unit so long as the CIS reads the maximum size that can pass through in the image reading apparatus 400.

In the above exemplary embodiments, all the units provided in the image reading apparatus 400 that convey the recording media S are conveying roller pairs. Alternatively, the recording media S may be conveyed using another component such as a conveying belt.

In the above exemplary embodiments, exhausting air by the axial flow fan 707a from the side opposed to the CIS 702a in the vertical direction causes air to circulate in the first reading unit 700a. Alternatively, a different configuration from those of the above exemplary embodiments may be employed so long as the configuration prevents heat from staying near the CIS 702a. For example, the axial flow fan 707a may be rotated backward to form air flow in the direction opposite to that in the above exemplary embodiments. Even this configuration achieves air circulation in the first reading unit 700a, preventing heat from staying near the CIS 702a.

In the above exemplary embodiments, the image forming system 1000 performs adjustment control of the image formation timing in the image forming apparatus 100 using the control unit (not illustrated) of the image forming apparatus 100. Alternatively, the image forming system 1000 may make a similar adjustment using a control apparatus provided outside the image forming apparatus 100. Yet alternatively, the adjustment control of the image forming apparatus 100 based on reading results of the image reading apparatus 400 may include not only adjustments on the image formation timing for reducing positional shifts in images, but also adjustments on color tones of images formed by the image forming apparatus 100.

The image forming system 1000 according to the above exemplary embodiments has the image reading apparatus 400 disposed adjacent to the image forming apparatus 100 and linked to the image forming apparatus 100. Alternatively, another apparatus such as a conveying apparatus to convey recording media or a cooling apparatus to convey and cool recording media may stand between the image forming apparatus 100 and the image reading apparatus 400.

According to the present disclosure, reduction in increasing temperatures of reading sensors provided in reading units is achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-054730, filed Mar. 25, 2020, which is hereby incorporated by reference herein in its entirety.

What is claimed is:

1. An image reading apparatus configured to read an image on a sheet conveyed from an image forming apparatus configured to form the image on the sheet, the image reading apparatus comprising:
   a conveying unit configured to convey the sheet in a conveying direction;
   a reading unit positioned downstream of the conveying unit in the conveying direction of the recording medium and configured to read the image on the sheet conveyed by the conveying unit; and
   an opposed unit opposed to the reading unit and forming a conveying path between the opposed unit and the reading unit,
   wherein the reading unit includes:
   a transparent member,
   a reading sensor configured to read the image on the sheet through the transparent member,
   a housing configured to define, together with the transparent member, an accommodation space configured to accommodate the reading sensor,
   a sensor supporting member configured to support the reading sensor movably with respect to the housing in the conveying direction in the accommodation space, and
   a fan positioned in the accommodation space and configured to circulate air in the accommodation space.

2. The image reading apparatus according to claim 1, wherein the reading unit further includes:
   a holding member holding the reading sensor, and
   a biasing member positioned in the holding member and configure to bias the reading sensor toward the transparent member.

3. The image reading apparatus according to claim 2, wherein the sensor supporting member includes two supporting shafts configured to support both end portions of the holding member.

4. The image reading apparatus according to claim 2,
   wherein the reading sensor includes a first reading sensor and a second reading sensor, and
   wherein the holding member holds the first reading sensor and the second reading sensor to overlap each other in a direction orthogonal to the conveying direction and a vertical direction, as viewed from the conveying direction.

5. The image reading apparatus according to claim 1, wherein the reading unit further includes a fan supporting member supporting the fan to the housing with a gap between an air intake surface of the fan and a bottom surface of the housing.

6. The image reading apparatus according to claim 5, wherein the fan supporting member supports the fan near a center of the housing in a direction orthogonal to the conveying direction and a vertical direction.

7. The image reading apparatus according to claim 1,
   wherein the reading unit further includes a duct portion fixed to the housing, and
   wherein the housing includes a first communication port to communicate a space defined by the duct portion with the accommodation space, and a second communication port at a position away from the first communication port in a direction orthogonal to the conveying direction and a vertical direction.

8. The image reading apparatus according to claim 7, wherein the fan forms air flow bringing air from the space defined by the duct portion into the accommodation space through the first communication port and bringing the air from the accommodation space through the second communication port into the space defined by the duct portion.

9. The image reading apparatus according to claim 7, wherein the reading unit further includes a fan supporting member supporting the fan at the first communication port to the housing.

10. The image reading apparatus according to claim 9, wherein the fan supporting member supports the fan inclined with respect to a bottom surface of the housing.

11. The image reading apparatus according to claim 1,
    wherein the opposed unit includes a conveyance guide at a position opposed to the transparent member in a vertical direction, and
    wherein the conveyance guide forms, together with the transparent member, a conveying path of the sheet to be conveyed by the conveying unit.

12. The image reading apparatus according to claim 1, further comprising another reading unit positioned downstream of the reading unit in the conveying direction,
    wherein, to read a side of the sheet opposite to a side of the sheet read by the reading unit, the other reading unit is positioned on the opposite side of the reading unit with respect to a conveying path of the sheet to be conveyed by the conveying unit.

13. The image reading apparatus according to claim 12, further comprising a discharge unit positioned downstream of the other reading unit in the conveying direction and configured to discharge the sheet out of the image reading apparatus.

14. The image reading apparatus according to claim 1, further comprising:
    an air intake fan positioned nearer to a front surface than the reading unit in a direction from the front surface to a back surface of the image reading apparatus and configured to take in air outside the image reading apparatus; and an air exhaust fan positioned nearer to the back surface than the reading unit in the direction from the front surface to the back surface of the image reading apparatus and configured to exhaust air inside the image reading apparatus.

15. The image reading apparatus according to claim 1, wherein, in a thickness direction of the transparent member, the fan is located on an opposite side opposite of a side on which the transparent member is located, with respect to the reading sensor.

16. An image forming system comprising:

an image forming apparatus configured to form an image on a sheet, and an image reading apparatus configured to read the image of the sheet conveyed from the image forming apparatus, wherein the image reading apparatus includes:

a conveying unit configured to convey the sheet in a conveying direction, a reading unit positioned downstream of the conveying unit in the conveying direction of the recording medium and configured to read the image on the sheet conveyed by the conveying unit, and an opposed unit opposed to the reading unit and forming a conveying path between the opposed unit and the reading unit, and wherein the reading unit includes:

a transparent member, a reading sensor configured to read the image on the sheet through the transparent member, a housing configured to define, together with the transparent member, an accommodation space configured to accommodate the reading sensor, a sensor supporting member configured to support the reading sensor movably with respect to the housing in the conveying direction in the accommodation space, and a fan positioned in the accommodation space and configured to circulate air in the accommodation space.

* * * * *